United States Patent
Johansson et al.

(10) Patent No.: US 7,296,177 B2
(45) Date of Patent: Nov. 13, 2007

(54) METHOD, SYSTEM, AND NETWORK ENTITY FOR DETECTING A CONNECTION FAULT

(75) Inventors: Sixten Johansson, Espoo (FI); Antti Kankkunen, Boston, MA (US)

(73) Assignee: Tellabs Oy, Espoo (FI)

( * ) Notice: Subject to any disclaimer, the term of this patent is extended or adjusted under 35 U.S.C. 154(b) by 625 days.

(21) Appl. No.: 10/692,276

(22) Filed: Oct. 22, 2003

(65) Prior Publication Data

US 2004/0133368 A1    Jul. 8, 2004

(30) Foreign Application Priority Data

Oct. 24, 2002    (FI)    .................... 20021895

(51) Int. Cl.
*G06F 11/00*    (2006.01)
(52) U.S. Cl. ............. 714/4; 709/224; 714/10; 714/11; 714/12; 714/13
(58) Field of Classification Search ............. 714/4, 714/10–13; 709/224
See application file for complete search history.

(56) References Cited

U.S. PATENT DOCUMENTS

| | | |
|---|---|---|
| 5,784,547 A | 7/1998 | Dittmar et al. |
| 5,983,294 A | 11/1999 | Kim et al. |
| 6,173,411 B1 | 1/2001 | Hirst et al. |
| 7,092,361 B2 * | 8/2006 | Puppa et al. ............ 370/242 |
| 2002/0138645 A1 | 9/2002 | Shinomiya et al. |
| 2003/0112748 A1* | 6/2003 | Puppa et al. ............ 370/217 |

FOREIGN PATENT DOCUMENTS

| | | |
|---|---|---|
| CN | 1333454 | 1/2002 |
| EP | 1 134 922 | 9/2001 |
| EP | 1320219 A2 | 6/2003 |
| JP | 06-120985 | 4/1994 |
| JP | 08-149131 | 6/1996 |
| JP | 2001-186581 | 7/2001 |
| KR | 00241355 B1 | 11/1999 |

* cited by examiner

*Primary Examiner*—Scott Baderman
*Assistant Examiner*—Tim Bonura
(74) *Attorney, Agent, or Firm*—Young & Thompson (57) ABSTRACT

A method, a system, and a network entity enable a detection of a connection fault and perform the switch-over in less than 50 ms. CV packets are being sent, for example, 1/10 ms (1 CV packet per 10 ms) or 1/15 ms (1 CV packet per 15 ms). The interval of the CV packets, consequently the frequency for sending CV packet, can be any interval that makes the switch-over time for a protected substantially real-time connection achievable. Moreover, the interval (the frequency) should be such that the interval makes the fault detection from the fault event to occur in less than 50 ms and triggers the switch-over to occur also in less than 50 ms from the occurrence of the fault event.

14 Claims, 6 Drawing Sheets

METHOD, SYSTEM, AND NETWORK ENTITY FOR DETECTING A CONNECTION FAULT

TECHNICAL FIELD OF THE INVENTION

The present invention relates generally to communicating data over a communication link.

BACKGROUND OF THE INVENTION

Ever since the formation of the global network of interconnected computing devices such as the Internet, there is being a huge emerging of various communication formats enabling these computing devices to communicate among themselves. This has created various services for users in business and non-business areas. In later half of 1990's we saw the boom of the Internet. A whole set of new services and content became available to the consumers during a short, revolutionary and hype intense period. That period introduced e-commerce, Internet Service Providers (ISPs), Portals, eyeballs game, dotcom companies and even the new economy.

However, many of the communication formats were originally designed for traditional packet based transmission, where association to real time event typically lacked. An example of such a communication is the web pages and web surfing. Also many trusted application such as banking could be taken care with possible delays. Even the fastest data communication ways such as Asynchronous Transfer Mode (ATM) were designed, despite of the ultimate data transfer speed, to quite delay tolerant environments. Lately the telecommunication industry has been highly focused on their leap towards using IP for telecommunication services. As one alternative, Multiprotocol Label Switching (MPLS) can be chosen as the bearer of IP, especially in large backbone networks.

However, the MPLS carries the heritage of delay tolerant based data communication such as the ATM, despite offering a fast way to transfer data. Consequently, there are still some remains of the ATM in the MPLS. One example is the principal design for applications substantially based on non real time or alternatively expressed as delay tolerance.

Examples of such approaches have been presented according to standardization specification drafts of the ITU-T: Y.1710 "Requirements for OAM functionality in MPLS networks" COM 13-14-E July 2002, Y.1711 "OAM mechanism for MPLS networks" COM 13-15-E July 2002, and Y.1720 "Protection Switching for MPLS networks" COM 13-R 14-E June 2001, all three incorporated herein as a reference, where Connectivity Verification (CV) packets are sent 1/s (1 per second). This standard solution provides a fault detection time of three seconds from the fault event.

Existing MPLS Path failure-detecting mechanism can inform both ends of the backbone about failures using the backward and forward detect indicators (BDI and FDI), although typically Label Switched Path (LSP) has a one-way character. The Connectivity Verification (CV) packets check the network for Path-specific errors like mis-merging or swapped Paths. A Path failure has occurred when defects on three consecutive CV packets have been detected. This means that it takes three seconds before a failure alert for a Path error can be detected and sent further.

A disadvantage of the above-identified standards is that the solutions according to the above-identified standards are not adequate for any communication or connections requiring real time functionality. Moreover, the switch-over time is not fast enough with substantially real-time based connections, where a switch-over is typically required in less than 50 ms.

In view of various inherent limitations of communication and systems between computing devices, it would be desirable to avoid or mitigate these and other problems associated with prior art. Thus, there is a need to have a fault detection and switch-over functionality for real time application.

SUMMARY OF THE INVENTION

Now a method, a system and a network entity have been invented for detecting a fault and performing a switch-over functionality for real time application.

In accordance with a first aspect of the invention there is provided a method for detecting a connection fault and accordingly performing a switch-over in data communication in accordance with a set of rules based on Operation and Maintenance data communication principles, wherein an interval for sending connectivity verification data information in the data communication is such that a real time based data communication is achievable.

In accordance with a second aspect of the invention there is provided a system for detecting a connection fault and accordingly performing a switch-over in data communication between a source computing device and a sink computing device in accordance with a set of rules based on Operation and Maintenance data communication principles, wherein an interval for sending connectivity verification data information in the data communication is such that a real time based data communication is achievable.

In accordance with a third aspect of the invention, there is provided a network entity for detecting a connection fault and accordingly performing a switch-over in data communication in accordance with a set of rules based on Operation and Maintenance data communication principles, the network entity comprises means for sending connectivity verification data information with a frequency in the data communication such that a real time based data communication is achievable.

In accordance with the fourth aspect of the invention, there is provided a network entity for detecting a connection fault and accordingly performing a switch-over in data communication in accordance with a set of rules based on Operation and Maintenance data communication principles, the network entity comprises means for receiving connectivity verification data information with a frequency in the data communication such that a real time based data communication is achievable.

In preferred arrangement, method, system and network entity enable a detection of a connection fault and perform the switch-over in less than 50 ms. The solution differs from the standard at least in such a way that connectivity verification data information such as CV packets are being sent, for example, 1/10 ms (1 per 10 ms) or 1/15 ms (1 per 15 ms), which ever interval that makes the switch-over time for a protected substantially real-time based connection achievable, that makes the fault detection from the fault event to occur in less than 50 ms, and triggers the switch-over to occur also in less than 50 ms from the occurrence of the fault event.

A benefit of the embodied invention provides a solution to achieve same (or even better) switch-over time in, for example, MPLS networks as which have been achieved in Time Division Multiplexing (TDM) networks.

For better understanding of the present invention reference is made to the following description, taken in conjunction with the accompanying drawings, and its scope will be pointed out in the appending claims.

BRIEF DESCRIPTION OF THE DRAWINGS

The invention will now be described, by way of example only, with reference to the accompanying drawings, in which.

DETAILED DESCRIPTION OF THE EMBODIMENTS

The preferred embodiments of the invention provide a method, a system, and a network entity to enable a detection of a connection fault and perform the switch-over in less than 50 ms. The solution differs from the standard at least in such a way that connectivity verification data information such as CV packets are being sent, for example, 1/10 ms (1 CV packet per 10 ms) or 1/15 ms (1 CV packet per 15 ms). The interval of the CV packets, consequently the frequency for sending the CV packet, can be any interval that makes the switch-over time for a protected substantially real-time based connection achievable. Moreover, the interval (the frequency) should be such that the interval makes the fault detection from the fault event to occur in less than 50 ms and triggers the switch-over to occur also in less than 50 ms from the occurrence of the fault event.

The appliance of the embodied invention for real time data communication provides also an advantage over the current Voice over IP (VOIP) solutions as the monitoring of the network traffic, which is based on the label(s) as defined in the MPLS and Ethernet based solution, is considerably faster than the current solution of the VoIP.

Some embodiments of the invention apply Operation and Maintenance (OAM) data communication principles. The OAM is a technology that covers how one gets an overview of the network performance and its traffic behavior, the networks detection of errors and how they are handled, and the discovery of inconvenient configurations. Some more technical details on the OAM can be found from the standardization specifications drafts of the ITU-T: Y.1710, Y.1711, and Y.1720, all three incorporated herein as a reference.

Some embodiments of the invention apply connectivity verification data information. By the connectivity verification data information, it is verified that the connection exists and that the connection is appropriate between the network nodes. The Connectivity Verification (CV) packets can be applied as the connectivity verification data information. The CV flow is generated at the Label Switched Path's (LSP's) source Label Switched Router (LSR) with a nominal frequency of, for example, 1/10 ms (1 CV packet per 10 ms) or 1/15 ms (1 CV packet per 15 ms). The interval for the CV flow generation nominal frequency can be which ever interval that makes the switch-over time for a protected real-time based connection achievable, and which interval makes the fault detection from the fault event to occur in less than 50 ms and, consequently, triggers the switch-over to occur also in less than 50 ms from the occurrence of the fault event. The CV flow is terminated at the LSP's sink LSR. The CV packet contains a network-unique identifier such as TTSI (Trail Termination Source Identifier) so that all types of defects can be detected. Alternatively, in Ethernet based solution connectivity verification data information can be referred by a different name, however, by the connectivity verification data information, it is verified that the connection exists and that the connection is appropriate between the network nodes.

The connection comprises a functional connection between a Source and the Sink in a system of interconnected computing devices in accordance with the protection switching data communication principles. Preferably, the connection comprises fast IP based connection for various appliances such as web application, e-mail, file transfer, host sessions, newsgroups, directory services, network management, and file services. The examples are described in the OSI reference model. Preferably, the Source and the Sink are coupled via the optical fiber. Alternatively, a cable coupling such as a copper cable coupling or a radio link coupling can be applied as well. The switch-over takes place for the previous connection (typically working connection), which suffers from the faulty connection or alternatively referred to as a connection error or a failure during the data communication. The faulty connection can be a physical or functional between the Source and the Sink and can be caused by termination of the capability of an entity to transfer user or OAM (Operation and Maintenance) information.

In the following, technical details about the OAM's & the CV's functionality are provided for some embodiments of the invention.

Figure 1:
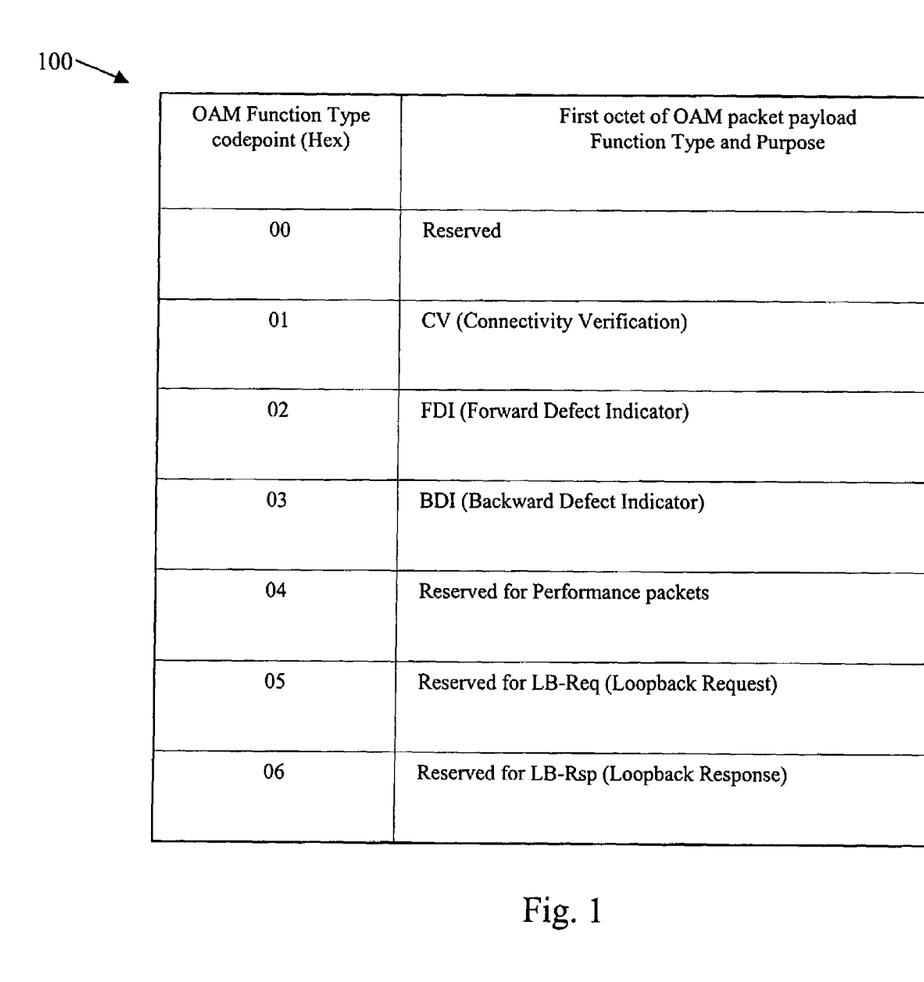
FIG. 1 depicts an example of an OAM function type codepoints.

The CV is an important operational part of the OAM, by which data communication and functional connection(s) between two network nodes can be monitored relatively reliably. The OAM defect detection function is based on the periodic transmission of CV packets from ingress to egress of an LSP. The CV packet generation rate is, for example, 1/10 ms or 1/15 ms. The interval for the CV flow generation nominal frequency can be which ever interval that makes the switch-over time for a protected real-time based connection achievable, and which makes the fault detection from the fault event to occur in less than 50 ms. As a consequence of the appropriate interval, the switch-over is triggered to occur in less than 50 ms from the occurrence of the fault event. Each CV packet carries a unique TTSI (Trail Termination Source Identifier), which is composed of the source LSR identifier, and the LSP identifier. An LSP enters a defect state when one of the defects noted in section 3 of the daft Y.1711 occurs. All OAM packets are identified in terms of a function type by the first octet of the OAM packet payload as depicted in the example of FIG. 1. Thus, OAM function type codepoints (100) are depicted.

Figure 2:
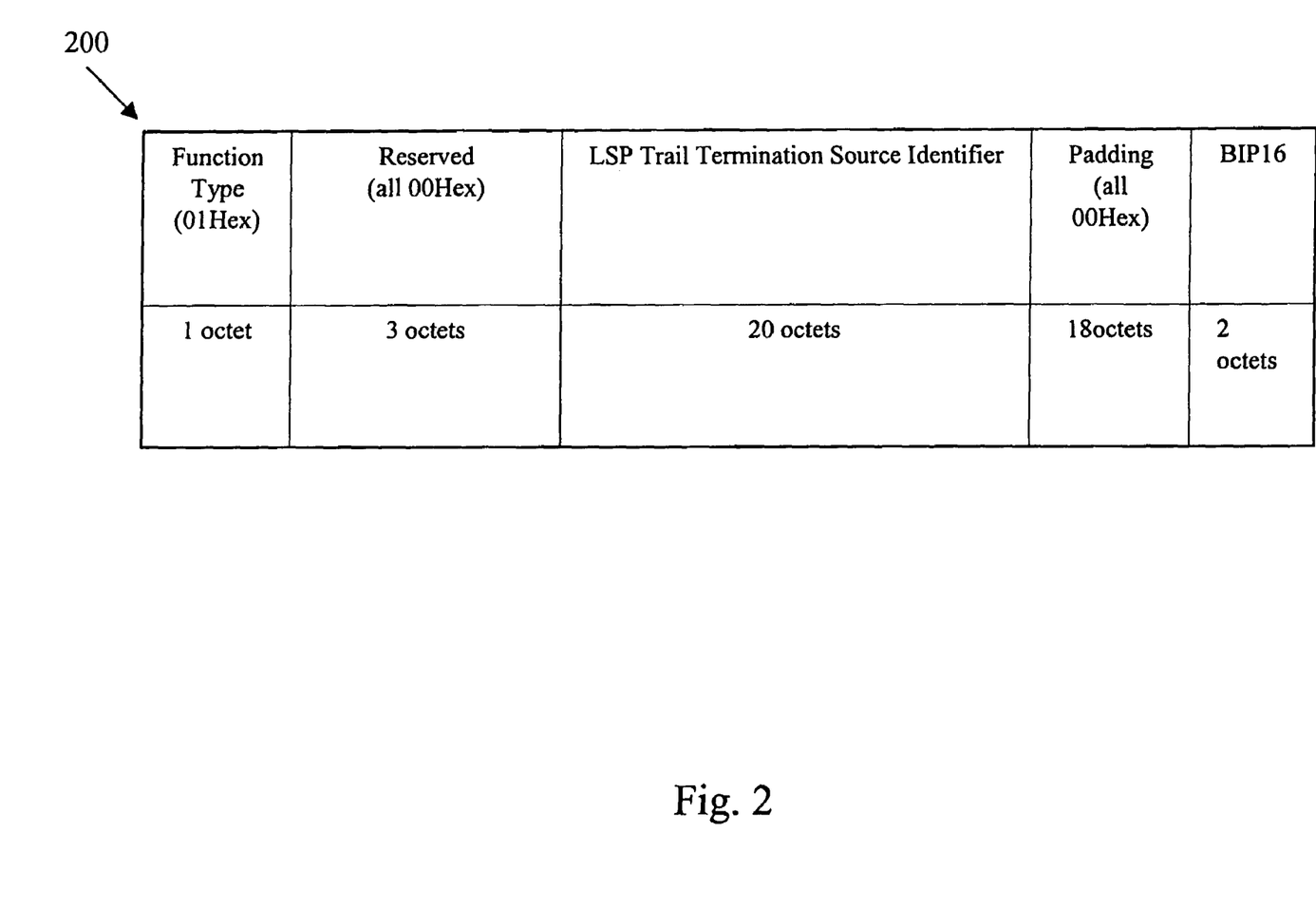
FIG. 2 depicts an example of a payload structure of the CV packet.

Still referring to the CV. The Connectivity Verification function is used to detect/diagnose all types of LSP connectivity defects (sourced either from below or within the MPLS layer networks). An example of a payload structure of the CV (200) is depicted in the FIG. 2.

In the following, technical details about CV Source and Sink Processing are provided for some embodiments of the invention.

CV source generation and CV sink processing should be considered as independent functions. This functional decoupling allows operators the flexibility to use different degrees of LSP monitoring on a per LSP basis, for example, between those LSPs deemed as 'important' and those LSPs deemed 'less-important'.

CV generation can be considered as a relatively trivial function, for example since it never varies, and is much simpler than CV sink processing. Hence, CV generation could be enabled on all (or most) of the LSPs, but the sink processing could be decomposed into several 'degree classes' per LSP such as:

1. No CV processing. Hence, no defect processing, no availability measurements and no network performance measurements.

2. A simple check of CV arrivals without examining the TTSI (though it is assumed the TTSI is still generated). This cannot provide totally reliable connectivity verification since it cannot detect certain defects, for example d-Mismerge/d-Mismatch.

3. Only a very simple check for arrival of CV packets with an unexpected TTSI. This could be used on less important LSPs as a simple method for detecting leakage of important LSP traffic (into the less important LSP). However, there might be no other defect processing done (for example dLOCV) and no availability measurements.

4. Full defect processing but no availability measurements. Note that if availability measurements are not being done, network performance measurements are also strictly not possible (since these should only relate to when the LSP is in the available state).

5. Full defect processing and availability measurements. This alternative also allows the option of network performance measurements too.

In the following technical details on principles on protection switching is provided for some embodiments of the invention.

Protection switching is a fully allocated protection mechanism that can be used on any topology. It is fully allocated in the sense that the route and bandwidth of the protection entity is reserved for a selected working entity. To be effective under all possible failures of the working entity however, the protection entity must be known to have complete physical diversity over all common-failure modes. This may not always be possible.

The MPLS PS architecture can be a 1+1 type, a 1:1 type, or 1:N type, and all can be applied in the embodied invention.

Figure 3:
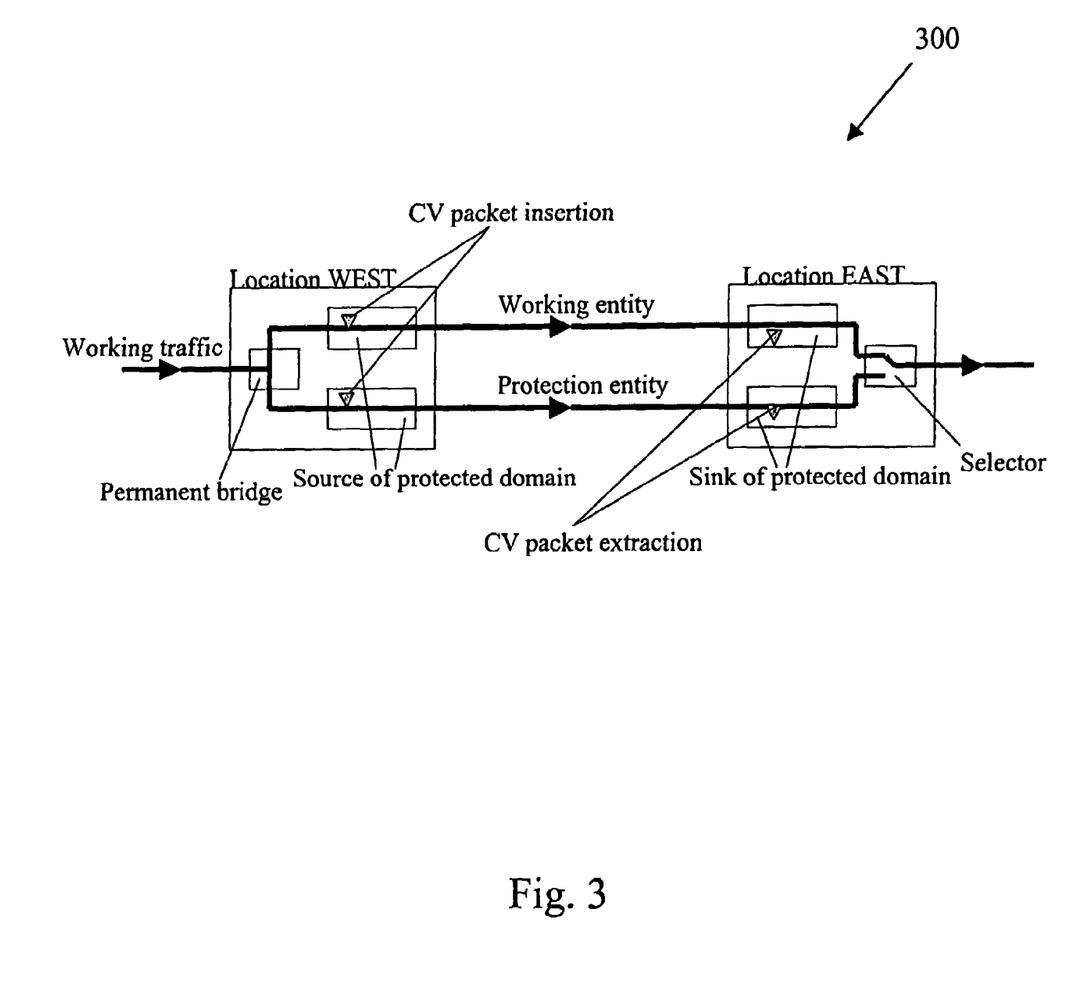
FIG. 3 depicts an example of 1+1 protection switching architecture.

In the 1+1 architecture type, a protection entity is dedicated to each working entity with the working entity bridged onto the protection entity at the source of the protected domain. The traffic on working and protection entities is transmitted simultaneously to the sink of the protected domain, where a selection between the working and protection entity is made based on some predetermined criteria, such as defect indication. An example of the 1+1 architecture (300) is depicted in the FIG. 3.

In the 1:1 architecture type, a protection entity is dedicated to each working entity. The working traffic is transmitted either by working or protection entity. The method for a selection between the working and protection entities depends on the mechanism. The protection entity can be used to carry (so-called) "extra traffic" when it is not used to transmit the working traffic.

Some more technical details on the protection switching can be found from the drafted standardization specification Y.1720.

Some embodiments of the invention apply real time communication. The real time can be considered as a level of computer responsiveness that a user senses as sufficiently immediate or that enables the computer to keep up with some external process (for example, to present visualizations of the weather as it constantly changes). The real-time is an adjective pertaining to computers or processes that operate in real time. The real time describes a human rather than a machine sense of time. The real time based data communication or connections are highly relevant in telecommunication, especially when the IP appliance is used.

Some embodiments of the invention apply Multiprotocol Label Switching (MPLS). The MPLS is a standards-approved technology for speeding up network traffic flow and making it easier to manage. MPLS involves setting up a specific path for a given sequence of packets, identified by a label put in each packet, thus saving the time needed for a router to look up the address to the next node to forward the packet to. MPLS is called multiprotocol because it works with the Internet Protocol (IP), Asynchronous Transport Mode (ATM), and frame relay network protocols. With reference to the standard model for a network (the Open Systems Interconnection, or OSI model), MPLS allows most packets to be forwarded at the layer 2 (switching) level rather than at the layer 3 (routing) level. In addition to moving traffic faster overall, MPLS makes it easy to manage a network for quality of service (QoS). For these reasons, the technique is expected to be readily adopted as networks begin to carry more and different mixtures of traffic.

The invention can be applied in many kinds of networks (not just the MPLS) where the OAM (Operation and Maintenance) kind of mechanism is used for monitoring of connection existence. As an example, the appliance in Ethernet based communication providing very fast data transfer. Fast Ethernet provides transmission speeds up to 100 megabits per second and is typically used for LAN, WAN, and MAN backbone systems, supporting workstations with cards. Gigabit Ethernet provides an even higher level of backbone support at 1000 megabits per second (1 gigabit or 1 billion bits per second). 10-Gigabit Ethernet provides up to 10 billion bits per second.

Fast Ethernet is a local area network (LAN) transmission standard that provides a data rate of 100 megabits per second. Alternatively, it can be applied in wide area networks (WANs) and metropolitan area networks (MANs). Workstations with existing 10 megabit per second Ethernet card can be connected to a Fast Ethernet network. (The 100 megabits per second is a shared data rate; input to each workstation is constrained by the 10 Mbps card.)

Gigabit Ethernet, a transmission technology based on the Ethernet frame format and protocol used in local area networks (LANs), provides a data rate of 1 billion bits per second (one gigabit). Alternatively, it can be applied in wide area networks (WANs) and metropolitan area networks (MANs). Gigabit Ethernet is defined in the IEEE 802.3 standard and is currently being used as the backbone in many enterprise networks. Gigabit Ethernet is carried primarily on optical fiber (with very short distances possible on copper media). Existing Ethernet LANs with 10 and 100 Mbps cards can feed into a Gigabit Ethernet backbone. An alternative technology that competes with Gigabit Ethernet is ATM.

A newer standard, 10-Gigabit Ethernet, is also becoming common. 10-Gigabit Ethernet, being standardized in IEEE 802.3ae, is a developing telecommunication technology that offers data speeds up to 10 billion bits per second. Built on the Ethernet technology used in most of today's local area networks (LANs), 10-Gigabit Ethernet is described as a "disruptive" technology that offers a more efficient and less expensive approach to moving data on backbone connections between networks while also providing a consistent technology end-to-end. Using optical fiber, 10-Gigabit Ethernet can replace existing networks that use ATM switches and SONET multiplexers on an OC-48 SONET ring with a simpler network of 10-Gigabit Ethernet switches and at the same time improve the data rate from 2.5 Gbps to 10 Gbps. 10-Gigabit Ethernet is used to interconnect local area networks (LANs), wide area networks (WANs), and metropolitan area networks (MANs). 10-Gigabit Ethernet uses the familiar IEEE 802.3 Ethernet media access control (MAC) protocol and its frame format and size. Like Fast Ethernet and Gigabit Ethernet, 10-Gigabit Ethernet uses full-duplex transmission, which makes possible a considerable distance range. On multimode fiber, 10-Gigabit Ethernet will support distances up to 300 meters; on single mode fiber, it will support distances up to 40 kilometers. Smaller Gigabit Ethernet networks can feed into a 10-Gigabit Ethernet network.

Figure 4:
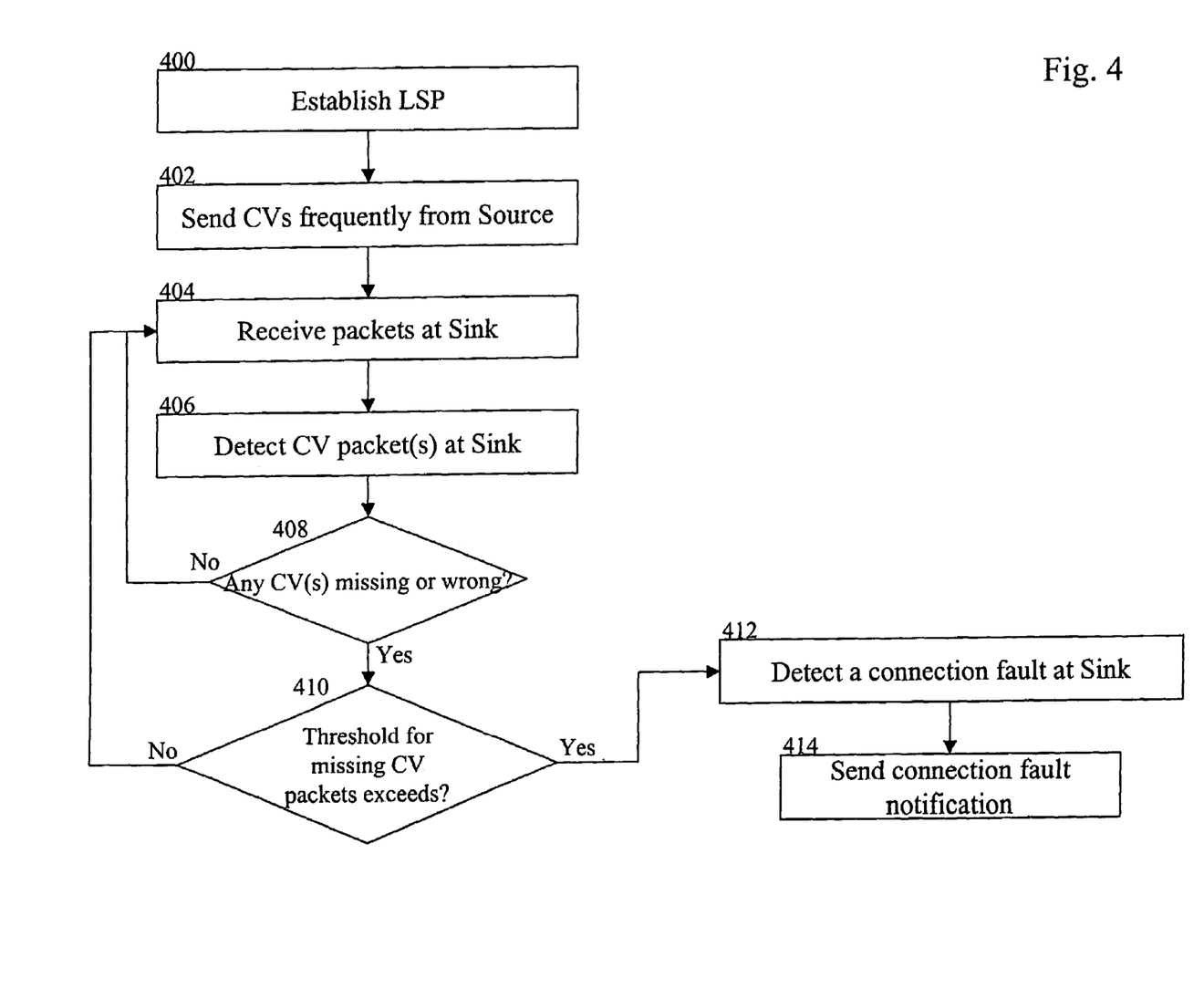
FIG. 4 depicts in a form of a flow chart a method for detecting a connection fault and accordingly performing a switch-over in accordance with an embodiment of the invention.

FIG. 4 has been described in the foregoing. In the following, corresponding reference signs have been applied to corresponding parts. FIG. 4 depicts in a form of a flow chart a method for detecting a connection fault and accordingly performing a switch-over in accordance with an embodiment of the invention. In step 400 there is established the LSP(s) between the Source and the Sink nodes. The drafted standardization specifications Y.1710, Y.1711, and Y.1720 provided details on the establishment step and on some part of the process. In step 402 the CVs are sent with a nominal frequency. The CVs are sent from the Source to the Sink. The CV flow is generated at the Label Switched Path's (LSP's) source Label Switched Router (LSR) with a nominal frequency of, for example, 1/10 ms (1 CV packet per 10 ms) or 1/15 ms (1 CV packet per 15 ms). The interval for the CV flow nominal frequency can be which ever interval that makes the switch-over time for a possibly protected real-time connection achievable. The interval for sending the CV packet (consequently the sending frequency) is such that it makes the fault detection from the fault event to occur in less than 50 ms. The interval triggers the switch-over to occur also in less than 50 ms from the occurrence of the fault event. The CV flow is terminated at the LSP's sink LSR. Thus, in step 404 the packets for the data communication between the Source and the Sink are received at the Sink. In step 406 the CV packets are detected among the received packets at the Sink. Steps 404 and 406 can be quite instant or even combined. In step 408 there is being monitored whether any CV packet(s) is missing or wrong. Every CV packet missing or wrong in the flow is registered. In step 410 a threshold for missing/wrong CV packets is met or exceeded. Preferably, the threshold is three consecutive missing or wrong CV packets. However, other threshold can be applied as well. If the threshold of the step 410 is met, a connection fault is detected at the Sink in step 412. Consequently, the connection fault notification can be sent in the network (step 414). In the steps 408 and 410 if there are no missing or wrong CV packet(s) or the threshold for the missing or wrong CV packets is not exceeded, for example, there are only few missing or wrong CV packets, the process returns to the step 404. The step 404 can be considered as a readiness state for detecting any possible missing or wrong CV packet.

Still referring to the example of FIG. 4, alternatively the detection can take place at network Routers such as LSR Sink, which does not necessary act as the final receiving end for the flow but can convey the flow forward. For example, the FDI is applied in this case to transfer the failure detect indication forward.

Figure 5:
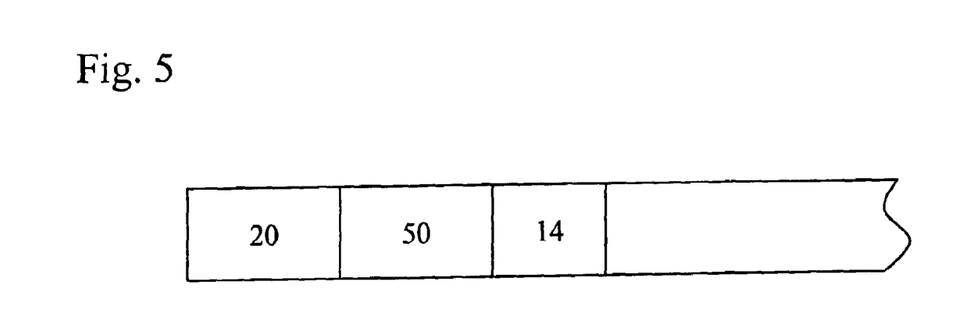
FIGS. 5 and 6 depict examples of the packet layer structure in data communication in accordance with the embodied invention.
Figure 6:
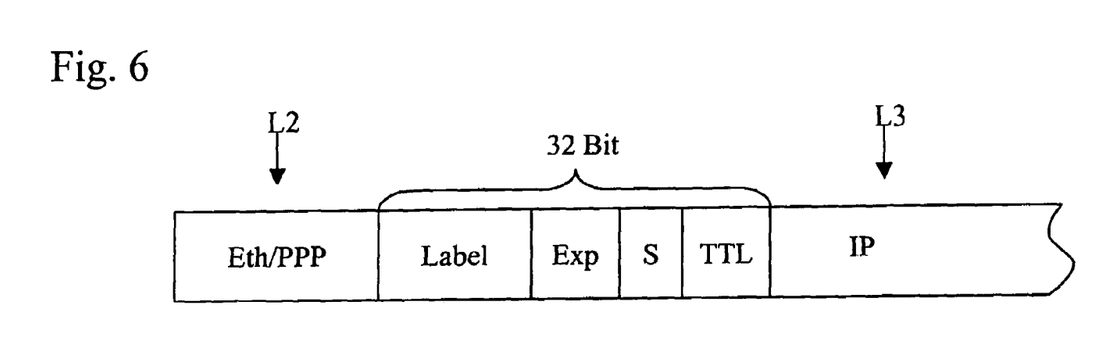

FIGS. 5 and 6 have been described in the foregoing. FIGS. 5 and 6 depict examples of the packet layer structure in data communication in accordance with the embodied invention. In FIG. 5 the packets indexed with identifier 20 depicts an identifier for a segment of the LSP. The packets indexed with identifier 50 depict the identifier for LSP traffic stream for which the OAM is applied to, and the index 14 represents OAM information packets. An example of the packet layer structure of the data communication in accordance with the embodied invention is depicted in FIG. 6. The lower layers of OSI reference model (L2, L3) are applied.

Figure 7:
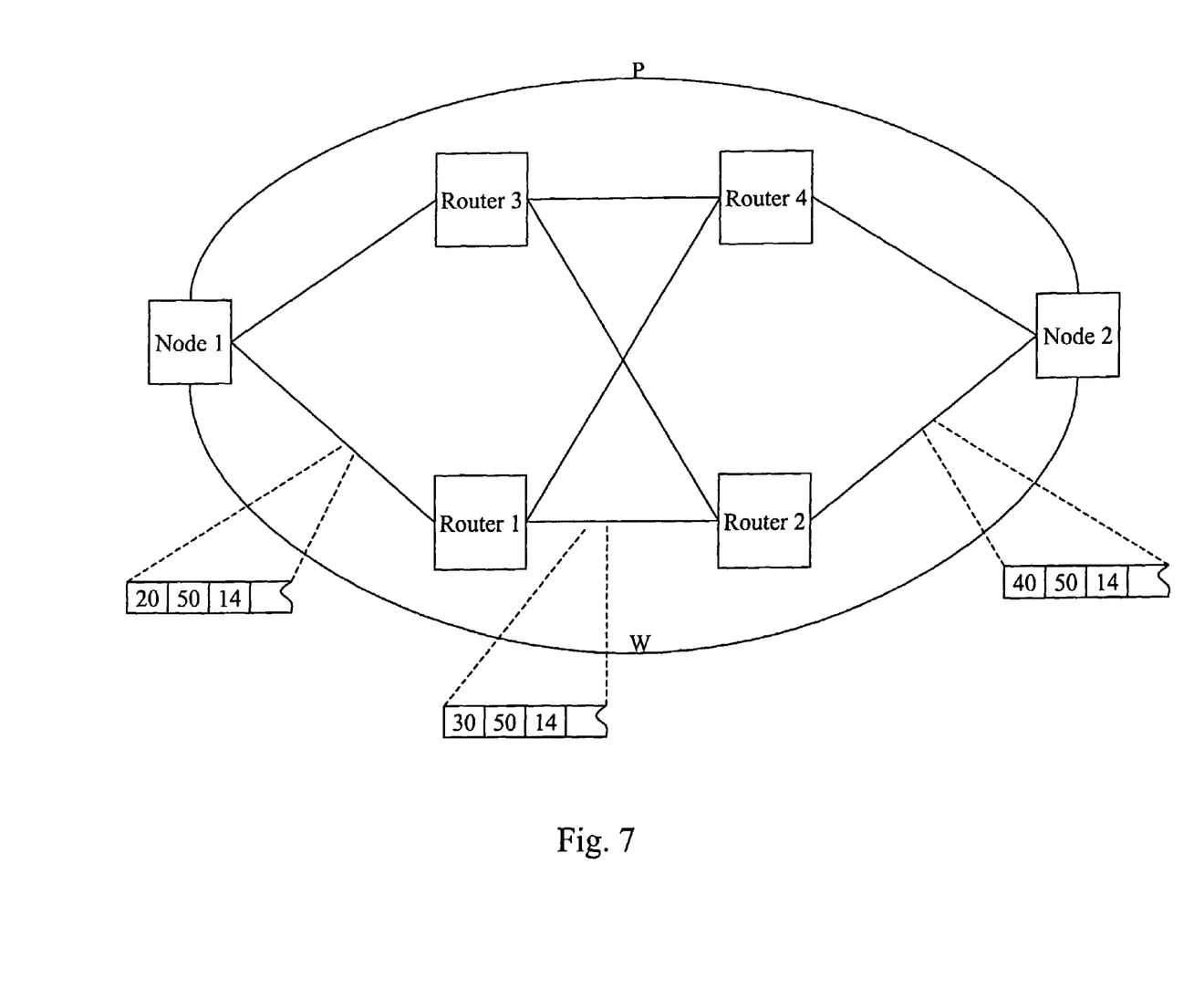
FIG. 7 depicts an embodiment of a network system in which the principles of the invention are applied.

FIG. 7 depicts an embodiment of a network system in which the principles of the invention are applied. The example of FIG. 7 applies the protected connection, and is based on the 1+1 protection switching architecture. A functional working connection (W) and a functional protecting connection (P) couples a node 1 with node 2 preferably via fast data transfer means. Preferably, optical fiber based data transfer lines are applied. Alternatively, the cable coupling such as the copper cable coupling or the radio link coupling can be applied as well. Typically, the data transfer means establish a backbone of IP based network connection. The system of FIG. 7 can operate as the large backbone network using IP for telecommunication services, and the MPLS can be applied as the bearer for such a network. The node 1 and 2 can be a data computing device operating in a data networks such as a computer server. The coupling of the node 1 and the node 2 is via routers 1, 2 and 3, 4, which may also cross. The LSP is established between the nodes via the routers. Data connection packets depicted in the FIG. 7 depicts the segment id (20,30,40) for different segment of the Path, the id (50), and OAM packets (14). The CV packets constitute a part of the OAM packet types (the CV type OAM packet). The sending of the CV packets is described above referring to the example of FIG. 4 step 402. The CV flow is generated in the Node 1. Thus, the node 1 is acting as a Source LSR for the LSP. The flow and the LSP is eventually directed to the node 2. Thus, the node 2 is acting as eventual Sink LSR for the LSP. The termination of the CV flow is operating at the Sink. Additionally the monitoring can take place at network Routers such as LSR Sink, which does not necessary act as the final receiving end for the flow but can convey the flow forward. For example, the FDI is applied in this case to transfer the failure detect indication forward.

The system, the network entity, and the computer program product can apply the procedures of the method described in the example of FIG. 4. Consequently, the method can operate in the example of FIG. 7.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims. Consequently, the options of implementing the invention as determined by the claims, including the equivalents, also belong to the scope of the present invention.

The invention claimed is:

1. A method for detecting a connection fault and accordingly performing a switch-over in data communication in accordance with a set of rules based on Operation and Maintenance data communication principles, characterized in that
an interval for sending connectivity verification data information in the data communication is such that a real time based data communication is achievable,
wherein the interval makes a fault detection from the connection fault in the data communication to occur in less than 50 milliseconds.

2. A method for detecting a connection fault and accordingly performing a switch-over in data communication in accordance with a set of rules based on Operation and Maintenance data communication principles, characterized in that
an interval for sending connectivity verification data information in the data communication is such that a real time based data communication is achievable,
wherein the interval comprises approximately one connectivity verification packet per 10 milliseconds.

3. A method for detecting a connection fault and accordingly performing a switch-over in data communication in accordance with a set of rules based on Operation and Maintenance data communication principles, characterized in that
an interval for sending connectivity verification data information in the data communication is such that a real time based data communication is achievable,
wherein the interval comprises approximately one connectivity verification packet per 15 milliseconds.

4. A method according to claim 1, wherein the interval further triggers the switch-over to occur in less than 50 milliseconds from an occurrence of the connection fault.

5. A method according to claim 1, wherein the real time based data communication presumes the switch-over to take place in less than 50 milliseconds from an occurrence of the connection fault.

6. A method according to claim 1, wherein the connection fault comprises a predetermined amount of consecutively missing or wrong connectivity verification packets in the data communication.

7. A method according to claim 1, wherein the data communication comprises at least one of Internet Protocol, Ethernet, and MPLS for real time telecommunication services.

8. A method according to claim 1, wherein the data communication comprises LSP based connection.

9. A method according to claim 1, wherein the data communication is based on a protection switching data communication principles.

10. A method according to claim 1, wherein Muitiprotocol Label Switching is contained as a bearer for the data communication.

11. A method according to claim 10, wherein Multiprotocol Label Switching operates as a backbone for IP based data communication.

12. A method according to claim 1, wherein the data communication takes place between a source computing entity and a sink computing entity.

13. A method according to any preceding claims, wherein the connectivity verification data information comprises CV packets.

14. A method for detecting a connection fault and accordingly performing a switch-over in data communication in accordance with a set of rules based on Operation and Maintenance data communication principles, characterized in that
an interval for sending connectivity verification data information in the data communication is such that a real time based data communication is achievable, wherein,
the interval in which the connection fault occurs, the connection fault is detected, and the switch-over in the data communication is triggered to occur is less than 50 ms, with the connectivity verification data information being in the form of connectivity verification packets being sent one connectivity verification packet per 15 ms.

* * * * *